US006706942B1

(12) United States Patent
Zhao et al.

(10) Patent No.: US 6,706,942 B1
(45) Date of Patent: Mar. 16, 2004

(54) MOLDED OR EXTRUDED ARTICLES COMPRISING POLYHYDROXYALKANOATE COPOLYMER COMPOSITIONS HAVING SHORT ANNEALING CYCLE TIMES

(75) Inventors: Jean Jiangun Zhao, Cincinnati, OH (US); Isao Noda, Fairfield, OH (US); Gary Wayne Gilbertson, Liberty Township, OH (US); Drew Clifton McAvoy, Cincinnati, OH (US); Brian Francis Gray, Cincinnati, OH (US); David Harry Melik, Cincinnati, OH (US)

(73) Assignee: The Procter & Gamble Company, Cincinnati, OH (US)

( * ) Notice: Subject to any disclaimer, the term of this patent is extended or adjusted under 35 U.S.C. 154(b) by 0 days.

(21) Appl. No.: 10/431,797

(22) Filed: May 8, 2003

(51) Int. Cl.$^7$ .......................... A61F 13/20; C08F 20/00
(52) U.S. Cl. .................. 604/364; 604/372; 528/361; 528/502; 528/503; 525/444; 264/176.1; 264/209.1; 264/211.17; 524/81; 524/220; 524/284; 524/297; 524/312; 524/314; 524/442; 524/445; 524/451
(58) Field of Search .................. 528/361, 502, 528/503; 525/444; 264/176.1, 209, 211.17; 604/364, 372; 524/81, 220, 284, 297, 312, 314, 442, 445, 451

(56) References Cited

U.S. PATENT DOCUMENTS

| 4,900,299 A | 2/1990 | Webb |
|---|---|---|
| 5,229,279 A | 7/1993 | Peoples et al. |
| 5,292,860 A | 3/1994 | Shiotani et al. |
| 5,489,470 A | 2/1996 | Noda |
| 5,498,692 A | 3/1996 | Noda |
| 5,502,116 A | 3/1996 | Noda |
| 5,534,432 A | 7/1996 | Peoples et al. |
| 5,536,564 A | 7/1996 | Noda |
| 5,602,227 A | 2/1997 | Noda |
| 5,618,855 A | 4/1997 | Noda |
| 5,653,930 A | 8/1997 | Noda et al. |
| 5,685,756 A | 11/1997 | Noda |
| 5,693,389 A | 12/1997 | Liggat |
| 5,738,646 A | 4/1998 | Fox et al. |
| 5,747,584 A | 5/1998 | Noda |
| 5,780,368 A | 7/1998 | Noda |
| 5,800,758 A | 9/1998 | Topolkaraev et al. |
| 5,821,299 A | 10/1998 | Noda et al. |
| 5,844,023 A | 12/1998 | Tomka |
| 5,849,854 A | 12/1998 | Noda |
| 5,874,486 A | 2/1999 | Bastioli et al. |
| 5,914,184 A | 6/1999 | Morman |
| 5,932,497 A | 8/1999 | Morman et al. |
| 5,942,597 A | 8/1999 | Noda et al. |
| 5,955,187 A | 9/1999 | McCormack et al. |
| 5,968,643 A | 10/1999 | Topolkaraev et al. |
| 5,973,100 A | 10/1999 | Asrar et al. |
| 5,990,271 A | 11/1999 | Noda |
| 6,002,064 A | 12/1999 | Kobylivker et al. |
| 6,013,590 A | 1/2000 | Noda |
| 6,015,764 A | 1/2000 | McCormack et al. |
| RE36,548 E | 2/2000 | Noda |
| 6,027,787 A | 2/2000 | Noda |
| 6,033,747 A | 3/2000 | Shiotani |
| 6,045,908 A | 4/2000 | Nakajima et al. |
| 6,077,931 A | 6/2000 | Noda |
| 6,096,809 A | 8/2000 | Lorcks et al. |
| 6,117,925 A | 9/2000 | Tomka |
| 6,143,947 A | 11/2000 | Noda |
| 6,160,199 A | 12/2000 | Noda |
| 6,174,990 B1 | 1/2001 | Noda |
| 6,225,438 B1 | 5/2001 | Green |
| 2002/0042599 A1 | 4/2002 | Zhao et al. |
| 2002/0143116 A1 | 10/2002 | Noda et al. |
| 2002/0143136 A1 | 10/2002 | Noda et al. |
| 2002/0188041 A1 | 12/2002 | Bond et al. |
| 2003/0036721 A1 | 2/2003 | Zhao et al. |
| 2003/0108701 A1 | 6/2003 | Bond et al. |

FOREIGN PATENT DOCUMENTS

| EP | 0753539 A1 | 1/1997 |
|---|---|---|
| EP | 0993832 | 4/2000 |
| JP | 10147653 | 6/1998 |
| JP | 11269754 | 10/1999 |
| WO | WO 95/20615 | 8/1995 |
| WO | WO 96/08535 | 3/1996 |
| WO | WO 98/28134 | 7/1998 |
| WO | WO 98/28135 | 7/1998 |
| WO | WO 98/29246 | 7/1998 |

(List continued on next page.)

OTHER PUBLICATIONS

Gagnon, K.D.; Lenz, R.W.; Farris, R.J.; Fuller, R.C.; *Crystallization Behavior and Its Influence on the Mechanical Properties of a Thermoplastic Elastomer Produced by Pseudomonas oleovorans*, Macromolecules, American Chemical Society, 25:pp. 3723–3728 (1992).

Fukui, T and Doi, Y.; *Efficient Production of Polyhydroxyalkanoates From Plant Oils by Alcaligenes Eutrophus and its Recombinant Strain*, Appl Microbiol Biotechnol, 49:pp. 333–336 (1998), Springer–Verlag.

Kichise, Tomoyasu; Fukui, Toshiaki; Yoshida, Yasuhiko; Doi, Yoshiharu; *Biosynthesis of Polyhydroxyalkanoates (PHA) by Recombinant Ralstonia Eutropha and Effects of PHA Synthase Activity on in Vivo PHA Biosynthesis*, International Journal of Biological Macromolecules, 25: pp. 69–77 (1999), Elsevier Science.

*Primary Examiner*—Samuel A. Acquah
(74) *Attorney, Agent, or Firm*—Bart S. Hersko; Leonard W. Lewis

(57) ABSTRACT

Environmentally degradable molded or extruded articles comprising a polyhydroxyalkanoate C4C6 copolymer composition having short annealing cycle times are provided. Such short annealing cycle times are achieved by compositions having a percentage of C6 units of 2–8%. Desirable annealing cycle times are obtained for molded or extruded articles, particularly for tampon applicators.

24 Claims, No Drawings

FOREIGN PATENT DOCUMENTS

| | | |
|---|---|---|
| WO | WO 98/29247 | 7/1998 |
| WO | WO 98/29481 | 7/1998 |
| WO | WO 98/44025 | 10/1998 |
| WO | WO 98/51474 | 11/1998 |
| WO | WO 99/05209 | 2/1999 |
| WO | WO 99/12734 | 3/1999 |
| WO | WO 99/14047 | 3/1999 |
| WO | WO 99/14262 | 3/1999 |
| WO | WO 99/14263 | 3/1999 |
| WO | WO 99/23139 | 5/1999 |
| WO | WO 99/23140 | 5/1999 |
| WO | WO 99/32272 | 7/1999 |
| WO | WO 99/67095 | 12/1999 |
| WO | WO 02/13877 A2 | 2/2002 |
| WO | WO 02/46277 | 6/2002 |
| WO | WO 02/74352 | 9/2002 |
| WO | WO 02/85983 | 10/2002 |

MOLDED OR EXTRUDED ARTICLES COMPRISING POLYHYDROXYALKANOATE COPOLYMER COMPOSITIONS HAVING SHORT ANNEALING CYCLE TIMES

FIELD OF INVENTION

The present invention relates to polyhydroxyalkanoate copolymer (PHA) compositions having short annealing cycle times for manufacturing molded or extruded articles such as, for example, disposable articles, in particular, tampon applicators. Such molded or extruded articles are readily environmentally degradable.

BACKGROUND OF THE INVENTION

Polyhydroxyalkanoates (PHAs) are thermoplastic polymers desirable for use in molded or extruded articles particularly due to their biodegradability. However, existing PHA copolymer compositions are slow to crystallize and producing molded or extruded articles therefrom remains nonviable commercially. It is necessary for compositions to solidify in a mold in as short a cycle time as possible to allow a manufacturing process to be economically feasible.

U.S. Pat. No. 5,498,692, issued Mar. 12, 1996 to Noda, and U.S. Pat. No. 5,502,116, issued Mar. 26, 1996 to Noda, relate to molded articles comprising PHAs. Molded articles from such PHAs remain substantially tacky after they are cooled down from the melt, and remain as such until sufficient crystallinity sets in, particularly with PHA copolymers levels above 10 wt %. Residual tack typically can lead to material sticking to itself or to the processing equipment, or both, and thereby can restrict the speed at which a polymeric product is produced or prevent the product from being collected in a form of suitable quality. A poly(3-hydroxybutyrate-co-3-hydroxyvalerate) product commercialized under the name BIOPOL® suffers from hardness, brittleness, and from having very slow crystallization kinetics. Similarly, U.S. Pat. No. 5,292,860 to Shiotani lacks teachings regarding compositions having short cycle times in the manufacturing process for molded or extruded articles.

Consequently, there is a need for melt processable compositions of PHAs having economically viable annealing cycle times for use in molded or extruded articles. Moreover, the compositions should be suitable for use in conventional processing equipment, be environmentally degradable, and meet consumer acceptability for their structural integrity and aesthetic characteristics of smoothness, flexibility, reduced stickiness, stability, and the like.

SUMMARY OF THE INVENTION

Molded or extruded articles of the present invention comprise a PHA copolymer having at least two randomly repeating monomer units (RRMUs) wherein a first monomer unit has structure (I)

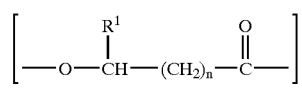

where $R^1$ is $CH_3$, and n is 1; and
wherein a second monomer unit has structure (II)

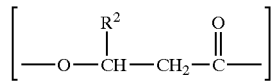

where $R^2$ is $CH_2CH_2CH_3$.

Such a PHA is referred to herein as a C4C6 PHA copolymer. For the present invention, between 2 and 8% of the randomly repeating monomer units has the structure of the second monomer unit, the C6 unit. Further, such compositions are demonstrated herein to provide an annealing cycle time that is at least ten seconds less than an annealing cycle time to form a molded or extruded article having the at least two randomly repeating monomer units wherein 8% or greater than 8% of the randomly repeating monomer units have the structure of the second monomer unit. In certain embodiments of the invention, such an annealing cycle time is at least 15, 20, 25, 30, 35, 40, 45, or 50 seconds less than an annealing cycle time to form a molded or extruded article having the at least two randomly repeating monomer units wherein 8% or greater than 8% of the randomly repeating monomer units have the structure of the second monomer unit. A process of forming a molded or extruded article comprises heating to a molten state a C4C6 PHA copolymer as described herein, allowing the melted blend to anneal; and molding or extruding the article, the process having an annealing cycle time that is at least ten seconds less than an annealing cycle time to form a molded or extruded article having the at least two randomly repeating monomer units wherein 8% or greater than 8% of the randomly repeating monomer units have the structure of the second monomer unit.

The present invention also provides flushable tampon applicators comprising such PHA compositions wherein the applicator is greater than 50% disintegrated within 28 days under anaerobic conditions.

Filed on an even date herewith is U.S. Pat. Ser. No. 10/431,796, of the present inventors to PHA compositions in blends with an environmentally degradable polymer wherein molded or extruded articles made therefrom also provide annealing cycle times that are commercially feasible.

DETAILED DESCRIPTION OF THE INVENTION

As used herein, a "molded or extruded article" is an object that is formed from a PHA copolymer as set forth herein using molding or extrusion techniques such as injection molding, blow molding, compression molding, or extrusion of pipes, tubes, profiles, cables, or films. Molded or extruded articles may be solid objects such as, for example, toys, or hollow objects such as, for example, bottles, containers, tampon applicators, applicators for insertion of medications into bodily orifices, medical equipment for single use, surgical equipment, or the like.

The annealing cycle time is defined herein as holding time plus cooling time. With process conditions substantially optimized for a particular mold, an annealing cycle time is a function of copolymer composition. Process conditions substantially optimized are the temperature settings of the zones, nozzle, and mold of the molding apparatus, the shot size, the injection pressure, and the hold pressure. Annealing cycle times provided herein are at least ten seconds less than an annealing cycle time to form a molded or extruded article having the at least two randomly repeating monomer units wherein 8%, or greater than 8%, of the randomly repeating monomer units have the structure of the second monomer unit. In certain embodiments of the invention, the annealing cycle time for a molded or extruded article is at least 15, 20, 25, 30, 35, 40, 45, or 50 seconds less than an annealing cycle time to form a molded or extruded article having the at least two randomly repeating monomer units wherein 8% or greater than 8% of the randomly repeating monomer units have the structure of the second monomer unit. A dogbone tensile bar having dimensions of ½ inch length (L) (12.7 mm)×⅛ inch width (W) (3.175 mm)×1/16 inch height (H) (1.5875 mm) made using an Engel Tiebarless ES 60 TL injection molding machine as provided herein provides a standard article as representative of a molded or extruded article for measuring annealing cycle times herein.

The holding time is the length of time that a part is held under a holding pressure after initial material injection. The result is that air bubbles and/or sink marks, preferably both, are not visually observable on the exterior surface, preferably both exterior and interior surfaces (if applicable), with the naked eye (of a person with 20—20 vision and no vision defects) from a distance of about 20 cm from the surface of the molded or extruded article. This is to ensure the accuracy and cosmetic quality of the part. Shrinkage is taken into account by the mold design, however, shrinkage of about 1.5% to 5%, from about 1.0% to 2.5%, or 1.2% to 2.0% may occur. A shorter holding time is determined by reducing the holding time until parts do not pass the visual test described supra, do not conform to the shape and texture of the mold, are not completely filled, or exhibit excessive shrinkage. The length of time prior to the time at which such events occur is then recorded as a shorter holding time.

The cooling time is defined as the time for the part to become solidified in the mold and to be ejected readily from the mold. The mold includes at least two parts, so that the molded article is readily removed. For removal, the mold is opened at the parting line of the two parts. The finished molded part can be removed manually from the opened mold, or it can be pushed out automatically without human intervention by an ejector system as the mold is being opened. Depending on the part geometry, such ejectors may consist of pins or rings, embedded in the mold, that can be pushed forward when the mold is open. For example, the mold can contain standard dial-type or mechanical rod-type ejector pins to mechanically assist in the ejection of the molded parts. Suitable size rod-type ejector pins are ⅛" (3.175 mm), and the like. A shorter cooling time is determined by reducing the cooling time until parts become hung up on the mold and cannot readily pop out. The length of time prior to the time at which the part becomes hung up is then recorded as a shorter cooling time.

Processing temperatures that are set low enough to avoid thermal degradation of the polymer material, yet high enough to allow free flow of the material for molding are used The PHA copolymer is melt processed at melting temperatures less than about 180° C. or, more typically, less than about 160° C. to minimize thermal degradation. In general, polymers can thermally degrade when exposed to temperatures above the degradation temperature after melt for a period of time. As is understood by those skilled in the art in light of the present disclosure, the particular time required to cause thermal degradation will depend upon the particular material, the length of time above the melt temperature (Tm), and the number of degrees above the Tm. The temperatures can be as low as reasonably possible to allow free-flow of the polymer melt in order to minimize risk of thermal degradation. During extrusion, high shear in the extruder increases the temperature in the extruder higher than the set temperature. Therefore, the set temperatures may be lower than the melt temperature of the material. Low processing temperatures also help to reduce cycle time. For example, without limitation, the set temperature of the nozzle and barrel components of the injection molding machine can vary according to the melt processing temperature of the polymeric material and the type of molds used and can be from about 20° C. degrees below the Tm to about 30° C. above the Tm, but will typically be in the following ranges: nozzle, 120–170° C.; front zone, 100–160° C.; center zone, 100–160° C.; zone, 60–160° C. The set mold temperature of the injection molding machine is also dependent on the type of polymeric material and the type of molds used. A higher mold temperature helps polymers crystallize faster and reduces the cycle time. However, if the mold temperature is too high, the parts may come out of the mold deformed. The mold temperature is 5–60° C. Typically, the mold temperature is 25–50° C.

Molding injection speed is dependent on the flow rate of the compositions. The higher flow rate, the lower viscosity, the lower speed is needed for the injection molding. Injection speed can range from about 5 cm/sec to 20 cm/sec, in one embodiment, the injection speed is 10 cm/sec. If the viscosity is high, the injection speed is increased so that extruder pressure pushes the melt materials into the mold to fill the mold. The injection molding pressure is dependent on the processing temperature and shot size. Free flow is dependent upon the injection pressure reading not higher than about 14 Mpa.

Poly(3-Hydroxybutyrate-co-3-hydroxyhexanoate) Copolymers (C4C6 PHAs)

To obtain the annealing cycle times for manufacturing molded or extruded articles of the present invention, between 2 and 8 mole percent of the PHA copolymer comprises RRMUs having the structure of the second RRMU of structure (II). Suitably, the molar ratio of the first RRMU to the second RRMU in the copolymer is in the range between 98:2 to 92:8. In further embodiments, the molar ratio is in the range of from about 97.5:2.5 to about 92.5:7.5, 97:3 to about 93:7, 96.5:3.5 to about 93.5:6.5 or from about 96:4 to about 94:6. In addition, the polyhydroxyalkanoate copolymer suitably has a number average molecular weight of greater than about 50,000 g/mole, greater than 150,000 g/mole or, in a further embodiment, greater than 250,000 g/mole.

The C4C6 polyhydroxyalkanoate copolymers set forth herein can be synthesized by chemical or biological methods as disclosed, for example, by Noda in U.S. Pat. No. 5,990, 271, Noda, et al. in U.S. Pat. No. 5,942,597, both of which are incorporated herein by reference, Fukui, T. and Doi, Y. *Appl. Microbiol. Biotechnol*, 49:333–336 (1998), and Kichise, T. et al. *Int'l. J. of Biological Macromolecules*, 25:69–77 (1999). The amount of C6 in the final product is determined by standard methods such as NMR or GC MS methods such as described in Doi, Y. et al., *Macromolecules* 28, 4822 (1995) and Fukui, T. et al., *Biomacromolecules* 3, 618 (2002).

In molded or extruded articles of the present invention, C4C6 PHAs having 2%–8% C6 comprise 300% to 100%, 40% to 90% or, in a further embodiment of the invention, 50% to 85% weight percent of the molded or extruded article.

Optional Ingredients

Optional materials may be used as processing aids to modify the processability and/or to modify physical properties such as elasticity, tensile strength and modulus of the final product. Other benefits include, but are not limited to, stability including oxidative stability, brightness, color, flexibility, resiliency, workability, processing aids, viscosity modifiers, and odor control. These optional ingredients may be present in quantities of less than about 70%, from about 0.1% to about 50%, from about 0.1% to about 40% or, in another embodiment, from about 0.1% to about 20% by weight of the composition.

Plasticizers may be used in the composition to modify the mechanical properties of products formed from the composition. In general, a plasticizer tends to lower the modulus and tensile strength, and to increase the ultimate tensile elongation, impact strength, and tear strength of the polymeric product. The plasticizer may also be used to lower the melting point of the composition to thereby enable melt-processing at lower temperatures and to minimize energy requirements and thermal degradation. These plasticizers are typically not required in order to obtain the advantageous combination of properties discussed above.

Nonlimiting examples of plasticizers include hydroxyl plasticizers, sugar alcohols, polyols, hydrogen bond forming organic compounds which do not have hydroxyl group, including urea and urea derivatives, anhydrides of sugar alcohols, animal proteins, vegetable proteins, organic acid esters which are biodegradable, aliphatic acids, or the like. Suitable plasticizers are exemplified by glycerol triacetate, methyl ricinolate, dimethyl sebacate, dihexyl phthalate, caprolactone diol, caprolactone triol, and others such as those described in the above referenced U.S. Pat. Nos. 3,182,036 and 5,231,148.

In further embodiments, a plasticizer is selected from the group consisting of dimethyl sebacate, glycerin, triacetin, glycerol, monostearate, sorbitol, erythritol, glucidol, mannitol, sucrose, ethylene glycol, propylene glycol, diethylene glycol, triethylene glycol, diethylene glycol dibenzoate, dipropylene glycol dibenzoate, triethylene glycol caprate-caprylate, butylene glycol, pentamethylene glycol, hexamethylene glycol, diisobutyl adipate, oleic amide, erucic amide, palmitic amide, dimethyl acetamide, dimethyl sulfoxide, methyl pyrrolidone, tetramethylene sulfone, oxa monoacids, oxa diacids, polyoxa diacids, diglycolic acids, triethyl citrate, acetyl triethyl citrate, tri-n-butyl citrate, acetyl tri-n-butyl citrate, acetyl tri-n-hexyl citrate, alkyl lactates, phthalate polyesters, adipate polyesters, glutate polyesters, diisononyl phthalate, diisodecyl phthalate, dihexyl phthalate, alkyl alylether diester adipate, dibutoxyethoxyethyl adipate, and mixtures thereof. Suitable molecular weights are less than about 20,000 g/mol, less than about 5,000 g/mol or, in a further embodiment, less than about 1,000 g/mol. If present, the amount of plasticizer in the final molded or extruded article composition is from about 0.1% to about 70%, from about 0.5% to about 50% or, in a further embodiment, from about 1% to about 30%.

Nucleating agents are generally used to increase the crystallization rate, reduce the size of crystals, and improve transparency. Nucleating agents can also improve the melt-flow and demolding behavior of partly crystalline plastic materials such as thermoplastic polyesters. A second polyhydroxyalkanoate such as polyhydroxybutyrate can act as a nucleating agent for the first polyhydroxyalkanoate and thereby improve the crystallization rate of the first polyhydroxyalkanoate such as disclosed by Autran, et al. WO02/055581 and WO02/50156, each filed Dec. 20, 2001. Further nucleating agents include talc, boron nitride, titanium oxide, micromica, chalk, salts, sorbitol acetal, clay, calcium carbonate, sodium chloride, calcium phosphate, LICOMONT® CaV 102 and LICOMONT® NaV 101 (the calcium and sodium salt, respectively, of montanic acid, i.e., long chain (C28–C32) linear carboxylic acids) both of which are commercially available from the Clariant Corporation (Coventry, R.I.); and MILLAD® 3988 (1,2,3,4-bis-3,4-dimethylbenzylidene sorbitol) which is commercially available from Milliken Chemical (Inman, S.C.). Nucleating agents commonly constitute from about 0.01% to about 5% of the weight of the molded or extruded articles, when used.

Further optional ingredients include salts, slip agents, crystallization accelerators or retarders, odor masking agents, cross-linking agents, emulsifiers, surfactants, cyclodextrins, lubricants, other processing aids, optical brighteners, antioxidants, flame retardants, dyes, pigments, fillers, proteins and their alkali salts, waxes, tackifying resins, extenders, chitin, chitosan, and mixtures thereof.

A filler may further be selected from the group of clays, silica, mica, wollastonite, calcium hydroxide, calcium carbonate, sodium carbonate, magnesium carbonate, barium sulfate, magnesium sulfate, kaolin, calcium oxide, magnesium oxide, aluminum hydroxide, talc, titanium dioxide, wood flour, walnut shell flour, alpha cellulose floc, cellulose fibers, chitin, chitosan powders, organosilicone powders, nylon powders, polyester powders, polypropylene powders, starches, and mixtures thereof. When present, the amount of fillers is from 0.1% to 60% by weight of the molded or extruded articles.

A lubricant may, for example, be selected from the group consisting of metal soaps, hydrocarbon waxes, fatty acids, long-chain alcohols, fatty acid esters, fatty acid amides, silicones, fluorochemicals, acrylics, and mixtures thereof.

When present, the amount of lubricants is from 0.1% to 20% by weight of the molded or extruded articles.

Other polymers, such as non-degradable polymers, may also be used in the present invention depending upon final use of the molded or extruded article, processing, and degradation or flushability required. Commonly used thermoplastic polymers include polypropylene and copolymers thereof, polyethylene and copolymers thereof, polyamides and copolymers thereof, polyesters and copolymers thereof, and mixtures thereof. When present, the amount of non-degradable polymers is from about 0.1% to about 40% by weight of the molded or extruded articles.

Natural polymers may also be used in the present invention. Starch or a protein-based polymer can be used. Suitable starches include corn starch, potato starch, sweet potato starch, wheat starch, sago palm starch, tapioca starch, rice starch, soybean starch, arrow root starch, bracken starch, lotus starch, cassava starch, waxy maize starch, high amylose corn starch, and commercial amylose powder. Blends of starch may also be used. The starch should be destructurized. Suitable protein-based polymers include soy protein, zein protein, and combinations thereof. The natural polymer may be present in an amount of from about 0.1% to about 80% or, in a further embodiment, from about 1% to about 60%.

Extrusion and Molding

Molding and extrusion techniques such as injection molding, blow molding, compression molding, or extrusion of pipes, tubes, profiles, cables or films may be used with compositions of the present invention to form molded or extruded articles.

Injection molding of thermoplastics is a multi-step process by which a composition of the present invention is heated until it is molten, then forced into a closed mold where it is shaped, and finally solidified by cooling. The PHA copolymers and any optional ingredients are melt processed at melting temperatures less than about 180° C., more typically less than about 160° C. to minimize unwanted thermal degradation. Three common types of machines that are used in injection molding are ram, screw plasticator with injection, and reciprocating screw devices (see *Encyclopedia of Polymer Science and Engineering*, Vol. 8, pp. 102–138, John Wiley and Sons, New York, 1987 ("EPSE-3"). A ram injection molding machine is composed of a cylinder, spreader, and plunger. The plunger forces the melt in the mold. A screw plasticator with a second stage injection consists of a plasticator, directional valve, a cylinder without a spreader, and a ram. After plastication by the screw, the ram forces the melt into the mold. A reciprocating screw injection machine is composed of a barrel and a screw. The screw rotates to melt and mix the material and then moves forward to force the melt into the mold.

An example of a suitable injection molding machine is the Engel Tiebarless ES 60 TL apparatus having a mold, a nozzle, and a barrel that is divided into zones wherein each zone is equipped with thermocouples and temperature-control units. The zones of the injection molding machine can be described as front, center, and rear zones whereby the pellets are introduced into the front zone under controlled temperature. The temperature of the nozzle, mold, and barrel components of the injection molding machine can vary according to the melt processing temperature of the pellets and the molds used, but will typically be in the following ranges: nozzle, 120–170° C.; front zone, 100–160° C.; center zone 100–160° C.; rear zone 60–150° C.; and mold, 5–50° C. Other typical processing conditions include an injection pressure of from about 2100 kPa to about 13,790 kPa, a holding pressure of about 2800 kPa to about 11,030 kPa, a hold time of about 2 seconds to about 15 seconds, and an injection speed of from about 2 cm/sec. to about 20 cm/sec. Examples of other suitable injection molding machines include Van Dorn Model 150-RS-8F, Battenfeld Model 1600, and Engel Model ES80.

Compression molding in thermoplastics consists of charging a quantity of a composition of the present invention in the lower half of an open die. The top and bottom halves of the die are brought together under pressure, and then the molten composition conforms to the shape of the die. The mold is then cooled to harden the plastic (see EPSE-3).

Blow molding is used for producing bottles and other hollow objects (see EPSE-3). In this process, a tube of molten composition known as a parison is extruded into a closed, hollow mold. The parison is then expanded by a gas, thrusting the composition against the walls of a mold. Subsequent cooling hardens the plastic. The mold is then opened and the article removed.

Blow molding has a number of advantages over injection molding. The pressures used are much lower than injection molding. Blow molding can be typically accomplished at pressures of about 170 kPa to about 690 kPa between the plastic and the mold surface. By comparison, injection molding pressures can reach about 69,000 kPa to about 137,900 kPa (see EPSE-3). In cases where the composition has a molecular weight too high for easy flow through molds, blow molding is the technique of choice. High molecular weight polymers (or copolymers) often have better properties than low molecular weight polymers, for example high molecular weight materials have greater resistance to environmental stress cracking. (see EPSE-3). It is possible to make extremely thin walls in products with blow molding. This means less composition is used, and solidification times are shorter, resulting in lower costs through material conservation and higher throughput. Another important feature of blow molding is that since it uses only a female mold, slight changes in extrusion conditions at the parison nozzle can vary wall thickness (see EPSE-3). This is an advantage with structures whose necessary wall thicknesses cannot be predicted in advance. Evaluation of articles of several thicknesses can be undertaken, and the thinnest, thus lightest and cheapest, article that meets specifications can be used.

Extrusion is used to form extruded articles, such as pipes, tubes, rods, cables, or profile shapes. Compositions are fed into a heating chamber and moved through the chamber by a continuously revolving screw. Single screw or twin screw extruders are commonly used for plastic extrusion. The composition is plasticated and conveyed through a pipe die head. A haul-off draws the pipe through the calibration and cooling section with a calibration die, a vacuum tank calibration unit and a cooling unit. Rigid pipes are cut to length while flexible pipes are wound. Profile extrusion may be carried out in a one step process. Extrusion procedures are further described in Hensen, F., *Plastic Extrusion Technology*, p 43–100.

Flushable tampon applicators of the present invention are molded or extruded in a desired shape or configuration using a variety of molding or extrusion techniques to provide a thermoplastic applicator comprising an outer tubular member and an inner tubular member or plunger. In another embodiment, the outer tubular member and plunger may be made by different molding or extrusion techniques, and in a further embodiment, the outer member is molded or extruded from a composition of the present invention and the plunger is made from another environmentally degradable material.

Generally, the process of making flushable tampon applicators of the present invention involves charging a composition of the present invention into a compounder, and the composition is melt blended and processed to pellets. The pellets are then constructed into flushable tampon applicators using an injection molding apparatus. The injection molding process is typically carried out under controlled temperature, time, and speed and involves melt processing pellets or thermoplastic compositions wherein the melted thermoplastic composition is injected into a mold, cooled, and molded into a desired plastic object. Alternatively, the composition can be charged directly into an injection molding apparatus and the melt molded into the desired flushable tampon applicator.

One example of a procedure of making flushable tampon applicators of the present invention involves extruding the composition at a temperature above the melting temperature of the composition to form a rod, chopping the rod into pellets, and injection molding the pellets into the desired flushable tampon applicator form.

The compounders that are commonly used to melt blend thermoplastic compositions are generally single-screw extruders, twin-screw extruders, and kneader extruders. Examples of commercially available extruders suitable for use herein include the Black-Clawson single-screw extruders, the Werner and Pfleiderer co-rotating twin-screw extruders, the HAAKE® Polylab System counter-rotating twin screw extruders, and the Buss kneader extruders. General discussions of polymer compounding and extrusion molding are disclosed in the *Encyclopedia of Polymer Science and Engineering*, Vol. 6, pp. 571–631, 1986, and Vol. 11, pp. 262–285, 1988; John Wiley and Sons, New York.

The flushable tampon applicators of the present invention can be packaged in any suitable wrapper provided that the wrapper is soil proof and disposable with dry waste. Wrappers made from biodegradable materials that create minimal or no environmental concerns for their disposal are an embodiment of a wrapper. It is contemplated, however, that the tampon applicators of the present invention can be packaged in flushable wrappers made from paper, nonwoven, cellulose, thermoplastic, or any other suitable flushable material, or combinations of these materials.

Environmental Degradability and Flushability

The molded or extruded articles produced in the present invention are environmentally degradable. "Environmentally degradable" is defined as being biodegradable, disintegratable, dispersible, or compostable or a combination thereof. "Flushable" as used herein means that an article can be safely flushed into a sewer system without detrimental consequences to existing sewage infrastructure systems. As a result, molded or extruded articles of the present invention can be easily and safely disposed of in solid waste composting or wastewater collection and treatment systems. The environmental degradability of the molded or extruded articles of the present invention offers a solution to the problem of accumulation of such materials in the environment following their use. The flushability of the molded or extruded articles of the present invention when used in disposable products, such as tampon applicators, offer additional convenience and discreteness to the consumer. Although biodegradability, disintegratability, dispersibility, compostibility, and flushability all have different criteria and are measured through different tests, generally the molded or extruded articles of the present invention will meet more than one of these criteria.

Biodegradable is defined as when an organic material is exposed to aerobic conditions, the material will break down into simple compounds such as carbon dioxide and water or, under anaerobic conditions, the material will break down into simple compounds such as carbon dioxide, water, and methane by the action of natural occurring microorganisms. Biodegradability means that the organic constituents of the molded or extruded articles are subject to decomposition via biological activity and there is an absence of persistent metabolites.

A variety of different standardized biodegradability methods have been established by various organizations and in different countries. For example, for aerobic biodegradability, the American Society for Testing and Materials (ASTM) has established ASTM D 5338 (Standard Test Method for the Determining Aerobic Biodegradation of Plastic Materials Under Controlled Composting Conditions) for municipal solid waste composting, and ASTM D 5271 (Standard Test Method for Assessing the Aerobic Biodegradation of Plastic Materials in an Activated Sludge Wastewater Treatment System) for municipal wastewater treatment. These tests measure the percent of test material that mineralizes as a function of time by monitoring the amount of carbon dioxide being released as a result of assimilation by microorganisms in the matrix of interest The carbon dioxide production in these tests is typically measured via electrolytic respirometry. Other standard protocols, such 301 B from the Organization for Economic Cooperation and Development (OECD), may also be used to assess the aerobic biodegradability of a material. Standard biodegradation tests in the absence of oxygen are described in various protocols such as ASTM D 5511 (Standard Test Method for Determining the Anaerobic Biodegradation of Plastic Materials Under High Solids Anaerobic Digestion Conditions) or ASTM D 5526 (Standard Test Method for Determining Anaerobic Biodegradation of Plastic Materials Under Accelerated Landfill Conditions). These tests are used to assess the biodegradability of materials in septic tanks, anaerobic digestion or sanitary landfills.

Disintegration is when the molded or extruded article has the ability to break up into smaller pieces by physical, chemical or biological means. Disintegration is assessed by determining the weight loss of a material under specific environmental conditions. Both aerobic and anaerobic disintegration tests are used. In these tests the weight loss is typically determined by the amount of test material that is no longer retained on an 18 mesh sieve with 1 millimeter openings after exposure to activated or digester sludge. The difference in weight between the initial sample and the sample recovered on a screen is used to determine the rate and extent of disintegration. The testing for biodegradability and disintegration are similar since essentially the same environment is used for testing. The major difference is that the weight of the material remaining is measured for disintegration, while the evolved gases are measured for biodegradation.

Molded or extruded articles of the present invention have a greater than 50% disintegration within 28 days under anaerobic conditions and, in further embodiments, greater than 60%, or greater than 80% disintegration in 28 days under such conditions.

EXAMPLES

Molded Test Samples Comprising PHA C4C6 Copolymer Having Various Percentages C6

The following compositions are compounded and molded into test samples. The various compositions have designations as follows:

| COMPO-SITION | COMPONENTS OF COMPOSITION IN WEIGHT PERCENT |
|---|---|
| 1. | PHA[1] |
| 2. | PHA[1]/PHB[2]/DMSA[3]/TiO2[4]/KemamideE[5] = 77/3/17/2/1 |
| 12. | PHA[12]/PHB[2]/DMSA[3]/TiO2[4]/KemamideE[5] = 77/3/17/2/1 |
| 14. | PHA[11]/PHB[2]/DMSA[3]/TiO2[4]/KemamideE[5] = 77/3/17/2/1 |
| 15. | PHA[14]/PHB[2]/DMSA[3]/TiO2[4]/KemamideE[5] = 77/3/17/2/1 |
| 16. | PHA[15]/PHB[2]/DMSA[3]/TiO2[4]/KemamideE[5] = 77/3/17/2/1 |
| 17. | PHA[14]/DMSA[3]/TiO2[4]/KemamideE[5] = 80/17/2/1 |
| 18. | PHA[15]/DMSA[3]/TiO2[4]/KemamideE[5] = 80/17/2/1 |

[1]A polyhydroxyalkanoate copolymer where the units are C4C6 where C4 is —O—CH(CH3)—CH2—C(O)— and C6 is —O—CH(C3H7)—CH2—C(O)— and the amount of C6 is 10–12% of total weight (11.3% C6)
[2]Polyhydroxybutyrate, particle size of 30 μm, available from Goodfellow Cambridge Limited England
[3]Dimethyl sebacate available from Scientific Polymer Products
[4]Titanium dioxide available from DuPont White Pigment & Mineral Products
[5]Euracamide available as Kemamide E Ultra from Crompton Corporation
[11]A polyhydroxyalkanoate copolymer where the units are C4C6 where C4 is —O—CH(CH3)—CH2—C(O)— and C6 is —O—CH(C3H7)—CH2—C(O)— and the amount of C6 is 15–17% of total weight (16.5% C6)
[12]A polyhydroxyalkanoate copolymer where the units are C4C6 where C4 is —O—CH(CH3)—CH2—C(O)— and C6 is —O—CH(C3H7)—CH2—C(O)— and the amount of C6 is 5–6% of total weight (5.7%/5.9% C6 = 50/50, about 5.8%)
[14]A polyhydroxyalkanoate copolymer where the units are C4C6 where C4 is —O—CH(CH3)—CH2—C(O)— and C6 is —O—CH(C3H7)—CH2—C(O)— and the amount of C6 is 4–5% of total weight (4.5% C6)
[15]A polyhydroxyalkanoate copolymer where the units are C4C6 where C4 is —O—CH(CH3)—CH2—C(O)— and C6 is —O—CH(C3H7)—CH2—C(O)— and the amount of C6 is 3–4% of total weight (3.2% C6)

Compounding: Ingredients are weighed, dry blended together on a weight percent basis, and fed into a Werner Pfleider ZSK-30 co-rotating twin screw extruder having a screw diameter of 30 mm, six heating zones, and a four hole die plate. The melt mixture is extruded to the end of the extruder to the die to form four rods. The rods are carried on a conveyor, air cooled, and pelletized using a pelletizer for injection molding.

Alternatively, compositions are fed into a HAAKE® Polylab System counter-rotating twin screw extruder. The extruder is equipped with a single hole die plate for compounding the dry mixture into a single strand of molten plastic that is air-cooled and then pelletized using a pelletizer for injection molding.

Injection Molding. An Engel Tiebarless ES 200 TL injection molding machine or an ES 60 TL injection molding machine is used to make tampon applicators or standardized tensile bars termed "dogbones," respectively, using the compounded materials. The injection molding process uses a 25 mm screw and controlled processing conditions of temperature, time, speed, and pressure, wherein the pellets are melt processed, injected into a mold, cooled, and then molded into the desired tampon applicator or dogbone tensile bar.

A common injection molding procedure and parameters affecting molding are as follows. The injection molding machine is started and the temperatures are set for the hydraulic oil (for the machine, normally ~30C), for the materials (for four heating zones, see Tables 2, 3, and 4), and for the mold (35C-60C). The screw speed is set for the extruder.

The composition is fed into the hopper of the injection extruder. The screw takes the melt materials directly from the feed hopper and conveys it to the screw tip. The conveying action of the screw builds up pressure in front of its tip. This pressure pushes back the screw. As soon as there is enough supply of melt in the space for one shot, the rotation of the screw stops. At that time the nozzle has been pushed against the sprue bushing of the mold and the mold is clamped, then a sudden controlled pressure surge in the hydraulic cylinder pushes the screw forward and pumps the melt into the mold cavity. This portion of the procedure represents the initial fill cycle where the mold is about 95% volumetric filled and the hydraulic pressure of the injection machine is reached to a maximum.

Manually set parameters include injection speed (high enough to push the materials into the mold and not too high to give a lot of flashings, normally, 10 cm/sec, the range is 5 cm/sec–20 cm/sec), and shot size (too low will not fill the parts, but too high will have a lot of flushings), injection or filling cycle is affected by injection speed, temperature of the hydraulic oil, melt materials and mold, and viscosity of the materials, pressure dependency of screw drive is affected by the viscosity, molecular degradation, crystallinity, and molecular orientation in part surface, the part, and the surface quality.

The holding cycle begins when the hydraulic pressure is changed to the holding pressure. The rest of the materials (~5% volume) is packed into the mold cavity. The mold is held under pressure until the gates (melt materials go through the gates to the molded parts) in the mold freeze off (i.e., no more melt can get in or out of the parts). The time for this cycle is the holding time. Then the hydraulic pressure drops to zero.

Setting parameters include holding pressure (too high creates a lot of flushings, too low will not be able to push the remaining 5% materials into the parts to avoid voids and sink marks), holding time (long enough until the gates freeze off so that no more materials get in and out of the parts to insure the parts quality, otherwise, the parts will have irregular dimensions, voids, or sink marks), and the holding cycle is affected by the switch over to holding pressure, control of pressure reserve effects, temperature of cavity wall, deformation of mold, stability of clamping unit, and magnitude of clamping force effects.

When the molded parts are sufficiently solidified and cooled, the clamping unit opens. The molded parts are in the mold half that is mounted on the movable platen. Ejectors eject the parts at an adjustable distance from the stationary platen. Cooling time is long enough for auto ejection to occur.

Physical Properties. The tensile strength at break, percent elongation at break, and Young's modulus of the present materials are determined according to methods known in the art, for example, ASTM D882-95a test method described in "Standard Test Method for Tensile Properties of Thin Plastic Sheeting", pages 159–167. Compositions as set forth herein are injection molded to form "dogbone-shaped" test samples having dimensions of ½ inch length (L) (12.7 mm)×⅛ inch width (W) (3.175 mm)×1/16 inch height (H) (1.5875 mm). Such test samples are evaluated for tensile strength at break, percent elongation at break, and elastic modulus using an Instron Tensile Tester (Model 1122 from Instron Corporation located in Canton, Mass.) equipped with a 50 pound (22.67962 kg) load cell, grip separation of 2.54 cm, a gage length of 12.7 mm, 5 mm jaw gap, and a crosshead speed of 5.08 cm/minute. For each analysis, the "dogbone-shaped" test sample is stretched until breakage occurs, and a load-versus-extension plot is generated for determining the tensile strength at break, percent elongation at break, and elastic modulus properties. The tensile strength at break is the load at break divided by the cross-sectional area of the test sample, and is defined in units of mega-Pascal or MPa (newton/square meter). The percent elongation at break is determined by dividing the length of the extension at the point of rupture by the gage length, and then multiplying by 100. Young's modulus is the slope of the initial linear portion of the load-extension curve, and is defined in units of MPa.

Hardness properties are determined according to ASTM D2240-97 test method described in "Standard Test Method for Rubber Property-Durometer Hardness, pages 388–391. Compositions as set forth herein are injection molded into "dogbone-shaped" test samples that are stacked in groups of three dogbones per stack wherein each dogbone stack has a total thickness of 3/16 inch (4.7625 mm). The hardness value is measured at various points of the dogbone stack using a hardness instrument such as Model 307 L Shore D Durometer from PTC Instruments, and a mean hardness measurement is determined.

Table 1 provides physical properties of molded test samples of compositions 1., 2., 12., and 14.–18.

TABLE 1

Physical Properties of Molded Test Samples (Dogbone)

| Composition | Hardness (Shore D) | Break Stress, Mpa | Break Elongation, % | Young's Modulus, Mpa |
|---|---|---|---|---|
| 1. | 47 | 13 | 185 | 192 |
| 2. | 42 | 11 | 700 | 85 |
| 12. | 54 | 13 | 35 | 170 |
| 14. | 40 | 18 | 880 | 150 |
| 15. | 54 | 18 | 49 | 160 |
| 16. | 55 | 19 | 52 | 160 |
| 17. | 54 | 17 | 36 | 190 |
| 18. | 55 | 19 | 36 | 180 |

Composition 1. displays properties of "stickiness" and does not release readily from a mold. Compositions 2., 12., and 14.–18. display physical properties that are acceptable for a variety of molded articles and Table 1 teaches one of skill in the art how to choose a particular composition for a particular use. For example, for a softer article, a composition having a smaller hardness number and a lower Young's Modulus would be chosen. A larger break elongation indicates a more elastic composition with less brittleness. A higher break stress indicates a stronger integrity and higher durability.

Table 2 provides conditions for compounding using a twin screw extruder for compositions 2., 12., and 14.–18.

TABLE 2

Conditions for Compounding

| Composition | Zone 1 (° C.) | Zone 2 (° C.) | Zone 3 (° C.) | Zone 4 (° C.) | Zone 5 (° C.) | Zone 6 (° C.) | Die (° C.) | Melt (° C.) | Screw Speed (rpm) |
|---|---|---|---|---|---|---|---|---|---|
| 2. | Off | off | 120 | 135 | 140 | 145 | 130 | 135 | 100 |
| 12. | 120 | 140 | 160 | 140 | — | — | — | 151 | 25 |
| 14. | Off | off | 120 | 135 | 140 | 145 | 130 | 131 | 100 |
| 15. | 75 | 95 | 122 | 138 | 160 | 139 | 123 | 124 | 50 |
| 16. | 75 | 95 | 120 | 138 | 160 | 143 | 128 | 128 | 50 |
| 17. | 75 | 95 | 119 | 139 | 160 | 141 | 137 | 137 | 50 |
| 18. | 75 | 95 | 121 | 138 | 159 | 143 | 134 | 134 | 50 |

The annealing cycle time is defined herein as holding time plus cooling time for forming a molded article under optimized processing conditions of temperature, shot size, injection pressure and hold pressure.

Table 3. provides conditions for injection molding and annealing cycle times for tampon applicators for compositions 2., 12, and 14. For times over 30 seconds, 5 second intervals are used. Under 30 seconds, 1 second intervals are used.

TABLE 3

Injection Molding Conditions and Annealing Cycle Times for Tampon Applicators

| Injection Molding Settings | 2. | 12. | 14. |
|---|---|---|---|
| Zone 1 (° C.) | 127 | 127 | 127 |
| Zone 2 (° C.) | 127 | 127 | 127 |
| Zone 3 (° C.) | 132 | 132 | 132 |
| Nozzle (° C.) | 135 | 135 | 135 |
| Mold (° C.) | 35 | 35 | 35 |
| Shot Size (cm) | 3.18 | 3.18 | 3.25 |
| Injection Pressure (Mpa) | 12.7 | 11.7 | 13.8 |
| Hold Pressure (Mpa) | 6.9 | 3.4 | 3.4 |
| Hold Time (sec) | 20 | 5 | 20 |
| Cool Time (sec) | 120 | 10 | 180 |
| Annealing Cycle Time (sec) | 140 | 15 | 200 |

Data of Table 3 demonstrate that the annealing cycle time for a tampon applicator is less when a percentage of C6 units is less than 11.3% C6. Composition 12. with about 5.8 mol % C6 units has an annealing cycle time of 15 seconds, while composition 2. with about 11.3% C6 units has an annealing cycle time of 140 seconds. Therefore, the time for annealing was shortened by 125 seconds using the material having a percentage of C6 lower than 11.3%. The data also demonstrate that the annealing cycle time is greater when a percentage of C6 units is greater than 11.3% C6. Composition 14. with about 16.5 mol % C6 units has an annealing cycle time of 200 seconds, while composition 2. with about 11.3% C6 units has an annealing cycle time of 140 seconds. Therefore, the time for annealing was increased by 60 seconds using the material having a percentage of C6 greater than 11.3%.

Table 4 provides conditions for injection molding and annealing cycle times for standardized molded samples (dogbone) for compositions 2., 12., and 14.–18. The mold designs for an applicator and dogbone are different in that a dogbone mold is a conventional runner system with a sprue connected to runners and materials are sent to four gates. Each gate is opened to a different shaped molding for parts that are used for material physical testing. Dogbone tensile bars are made when only the dogbone molding gate is opened and the other three gates are closed. Dogbone tensile bars represent a standardized molded article.

Data of Table 4 demonstrate that the annealing cycle time for a standardized test molded article as represented by a dogbone article comprising C4C6 units where the amount of C6 is 3.2 mol % (compositions 16. and 18. ), 4.5 mol % (compositions 15. and 17. ), or about 5.8 mol % is (composition 12. ) is 48 seconds less than the annealing cycle time for an article having C4C6 units where the amount of C6 is 11.3 mol % (composition 2. ). Further, the annealing cycle time for such a standardized article is 30 seconds longer where the amount of C6 is 16.5 mol % (composition 14. ) as compared to the control amount of C6 at 11.3 mol % (composition 2.).

C4C6 PHAs having lower percentages of C6 have higher melting temperatures, lower elongation, and higher modulus in physical properties. As the percentage of C6 is lowered below about 2%, the present inventors expect that the higher melting temperature of such a material may lead to a narrower processing window (difference between melt temperature and degradation temperature) and difficulty in processing in that the material may be too stiff and brittle due to lower elongation and higher modulus.

The present inventors expect that as the percentage of C6 is increased from 5.8 mol % to 11.3 mol %, the annealing cycle time will increase and that the material will have increasing tackiness during processing as the percentage of C6 is increased. The present inventors expect that a cycle annealing time as described herein can be achieved using Q4C6 PHAs having up to about 8 mol % C6.

Anaerobic Disintegration. The purpose of this test is to assess the biological disintegration of a flushable product under anaerobic conditions. A high rate of disintegration provides evidence that the product will not be recognizable in septic tank septage or anaerobic digester sludge. The product is weighed and added to a 2L amber glass bottle that contains 1.5 L of anaerobic digester sludge. The bottles are capped with a one-hole stopper to allow for venting of the evolved gases. At the screening level three replicate bottles are placed in an incubator at 35° C. for each product in the test For confirmatory testing triplicate bottles are prepared for each time point. The test is conducted under static conditions. Periodically (7 day, 14 day and 28 day) a bottle is sacrificed and the content passed through a 1 m sieve. The material retained on the 1 mm sieve is dried and weighed, and the percent of product weight loss is determined. Table

TABLE 4

Injection Molding Conditions and Annealing Cycle Times for Standardized Molded Samples (Dogbone)

| Injection Molding Settings | 2. | 12. | 14. | 15. | 16. | 17. | 18. |
|---|---|---|---|---|---|---|---|
| Zone 1 (° C.) | 127 | 127 | 127 | 127 | 127 | 127 | 127 |
| Zone 2 (° C.) | 127 | 127 | 127 | 127 | 127 | 127 | 127 |
| Zone 3 (° C.) | 132 | 132 | 132 | 132 | 132 | 132 | 132 |
| Nozzle (° C.) | 135 | 135 | 135 | 135 | 135 | 135 | 135 |
| Mold (° C.) | 35 | 35 | 35 | 35 | 35 | 35 | 35 |
| Shot Size (cm) | 1.91 | 1.91 | 1.91 | 2.29 | 2.29 | 2.29 | 2.29 |
| Injection Pressure (Mpa) | 5.2 | 3.9 | 5.5 | 8.3 | 8.2 | 8.4 | 7.7 |
| Hold Pressure (Mpa) | 3.4 | 3.4 | 3.4 | 3.4 | 3.4 | 3.4 | 3.4 |
| Hold Time (sec) | 5 | 5 | 5 | 4 | 4 | 4 | 4 |
| Cool Time (sec) | 50 | 2 | 80 | 3 | 3 | 3 | 3 |
| Annealing Cycle Time (sec) | 55 | 7 | 85 | 7 | 7 | 7 | 7 |

5 provides such data for molded applicators of compositions 2., 12., and 14.

TABLE 5

Weight Loss in Anaerobic Disintegration Test

| Composition | 7 day (%) | 14 day (%) | 28 day (%) |
|---|---|---|---|
| 2. | 16 | 58 | 91 |
| 12. | 14 | 57 | 95 |
| 14. | 24 | 90 | 94 |

The data of Table 5 demonstrate that compositions comprising a polyhydroxyalkanoate copolymer having C4C6 units provide particularly desirable anaerobic disintegrations results.

Aerobic Disintegration. The purpose of this test is to assess the fate of a flushable product during onsite aerobic and municipal activated sludge wastewater treatment. A high rate of disintegration would indicate that biological degradation of the material is occurring. The test method is similar to other continuous flow activated sludge tests that have been developed for down-the-drain chemicals. This test differs from other tests in that the endpoint is loss of material mass in the system instead of loss of a specific chemical through the system. The test apparatus consists of a 6 L glass reactor with a porous stainless steel filter. The stainless steel filter is used to retain the activated sludge solids in the reactor. Raw wastewater is continuously fed to the reactor at a rate of approximately 15 mL/min. This corresponds to a hydraulic retention time (HRT) of about 7 hr. The mixed liquor suspended solids (MLSS) are periodically measured and a portion of the solids wasted on a weekly basis to maintain the MLSS between 2500 and 4500 mg/L. In this test pre-weighed material is placed in mesh bags (fiberglass screening with a 1.6 mm sieve opening) and then suspended in the porous pot reactor. At designated time points, one of the mesh bags with the material of interest is removed from the reactor and its content rinsed through a 1 mm sieve. The amount of the material remaining on the 1 mm sieve is then dried and weighed. The loss of the material mass is determined over time.

TABLE 6

Weight Loss of Composition 2. with Different Thicknesses in Aerobic Disintegration Test

| Thickness | 14 Day (%) | 28 Day (%) | 42 Day (%) | 56 Day (%) |
|---|---|---|---|---|
| 5 mil | 100 | 100 | 100 | 100 |
| 17 mil | 17 | 29 | 59 | 75 |
| 60 mil | 8 | 11 | 16 | 26 |

TABLE 7

Tampon Applicator (15–17 mil) Weight Loss in Aerobic Disintegration Test

| Composition | 14 Day (%) | 28 Day (%) | 42 Day (%) | 56 Day (%) |
|---|---|---|---|---|
| 2. | 13 | 24 | 37 | 55 |
| 12. | 15 | 27 | 41 | 59 |
| 14. | 8 | 21 | 32 | 51 |

The data of Tables 6 and 7 demonstrate that compositions comprising a polyhydroxyalkanoate copolymer having C4C6 units provide particularly desirable anaerobic disintegrations results. The rate of disintegration depends on the thickness of the articles. The amount of C6 units of the C4C6 PHA does not appear to affect the degradation rate.

All documents cited in the Detailed Description of the Invention are, in relevant part, incorporated herein by reference; the citation of any document is not to be construed as an admission that it is prior art with respect to the present invention.

While particular embodiments of the present invention have been illustrated and described, it would be obvious to those skilled in the art that various other changes and modifications can be made without departing from the spirit and scope of the invention. It is therefore intended to cover in the appended claims all such changes and modifications that are within the scope of this invention.

What is claimed is:

1. A molded or extruded article comprising:
   a polyhydroxyalkanoate copolymer comprising at least two randomly repeating monomer units
   wherein a first monomer unit has structure (I)

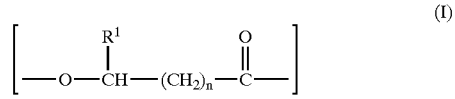

(I)

where $R^1$ is $CH_3$, and n is 1; and
wherein a second monomer unit has structure (II)

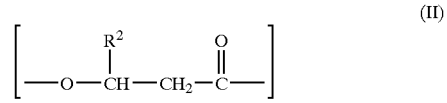

(II)

where $R^2$ is $CH_2CH_2CH_3$;
wherein between 2 and 8% of the randomly repeating monomer units have the structure of the second monomer unit, and
wherein an annealing cycle time to form the molded or extruded article is at least ten seconds less than an annealing cycle time to form a molded or extruded article having the at least two randomly repeating monomer units wherein 8% or greater than 8% of the randomly repeating monomer units have the structure of the second monomer unit.

2. The molded or extruded article of claim 1 wherein an annealing cycle time to form the molded or extruded article having between 2 and 8% of the randomly repeating monomer units of the structure of the second monomer unit is at least 15, 20, 25, 30, 35, 40, 45, or 50 seconds less than an annealing cycle time to form a molded or extruded article having the at least two randomly repeating monomer units wherein 8% or greater than 8% of the randomly repeating monomer units have the structure of the second monomer unit.

3. The molded or extruded article of claim 1 in the form of a tampon applicator.

4. The molded or extruded article of claim 1 wherein between 3 and 7% of the randomly repeating monomer units has the structure of the second monomer unit.

5. The molded or extruded article of claim 1 wherein between 4 and 6% of the randomly repeating monomer units has the structure of the second monomer unit.

6. The molded or extruded article of claim 1 further comprising a processing aid.

7. The molded or extruded article of claim 6 wherein the processing aid is a plasticizer selected from the group consisting of dimethyl sebacate, glycerin, triacetin, glycerol, monostearate, sorbitol, erythritol, glucidol, mannitol, sucrose, ethylene glycol, propylene glycol, diethylene glycol, triethylene glycol, diethylene glycol dibenzoate, dipropylene glycol dibenzoate, triethylene glycol caprate-caprylate, butylene glycol, pentamethylene glycol, hexamethylene glycol, diisobutyl adipate, oleic amide, erucic amide, palmitic amide, dimethyl acetamide, dimethyl sulfoxide, methyl pyrrolidone, tetramethylene sulfone, oxa monoacids, oxa diacids, polyoxa diacids, diglycolic acids, triethyl citrate, acetyl triethyl citrate, tri-n-butyl citrate, acetyl tri-n-butyl citrate, acetyl tri-n-hexyl citrate, alkyl lactates, phthalate polyesters, adipate polyesters, glutate polyesters, diisononyl phthalate, diisodecyl phthalate, dihexyl phthalate, alkyl alylether diester adipate, dibutoxyethoxyethyl adipate, and mixtures thereof.

8. The molded or extruded article of claim 6 wherein the processing aid is a nucleating agent selected from the group of polyhydroxybutyrate, sorbitol acetal, boron nitride, titanium oxide, talc, clay, calcium carbonate, sodium chloride, metal phosphate, and mixtures thereof.

9. The molded or extruded article of claim 6 wherein the processing aid is a filler selected from the group of clays, silica, mica, wollastonite, calcium hydroxide, calcium carbonate, sodium carbonate, magnesium carbonate, barium sulfate, magnesium sulfate, kaolin, calcium oxide, magnesium oxide, aluminum hydroxide, talc, titanium dioxide, wood flour, walnut shell flour, alpha cellulose floc, cellulose fibers, chitin, chitosan powders, organosilicone powders, nylon powders, polyester powders, polypropylene powders, starches and the mixtures thereof.

10. The molded or extruded article of claim 6 wherein the processing aid is a lubricant selected from the group consisting of metal soaps, hydrocarbon waxes, fatty acids, long-chain alcohols, fatty acid esters, fatty acid amides, silicones, fluorochemicals, acrylics, and mixtures thereof.

11. A flushable tampon applicator comprising:
a polyhydroxyalkanoate copolymer comprising at least two randomly repeating monomer units
wherein a first monomer unit has structure (I)

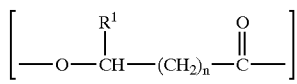

(I)

where $R^1$ is $CH_3$, and n is 1; and
wherein a second monomer unit has structure (II)

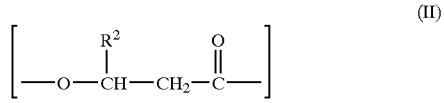

(II)

where $R^2$ is $CH_2CH_2CH_3$;
wherein between 2 and 8% of the randomly repeating monomer units has the structure of the second monomer unit.

12. The flushable tampon applicator of claim 11 wherein between 3 and 7% of the randomly repeating monomer units has the structure of the second monomer unit.

13. The flushable tampon applicator of claim 11 wherein between 4 and 6% of the randomly repeating monomer units has the structure of the second monomer unit.

14. The flushable tampon applicator of claim 11 wherein an annealing cycle time to form the tampon applicator is at least ten seconds less than an annealing cycle time to form a tampon applicator having the at least two randomly repeating monomer units wherein 8% or greater than 8% of the randomly repeating monomer units have the structure of the second monomer unit.

15. The flushable tampon applicator of claim 11 wherein an annealing cycle time to form the tampon applicator is at least 15, 20, 25, 30, 35, 40, 45, or 50 seconds less than an annealing cycle time to form a tampon applicator having the at least two randomly repeating monomer units wherein 8% or greater than 8% of the randomly repeating monomer units have the structure of the second monomer unit.

16. The flushable tampon applicator of claim 11 further comprising a processing aid.

17. The flushable tampon applicator of claim 11 wherein the processing aid is a plasticizer selected from the group consisting of dimethyl sebacate, glycerin, triacetin, glycerol, monostearate, sorbitol, erythritol, glucidol, mannitol, sucrose, ethylene glycol, propylene glycol, diethylene glycol, triethylene glycol, diethylene glycol dibenzoate, dipropylene glycol dibenzoate, triethylene glycol caprate-caprylate, butylene glycol, pentamethylene glycol, hexamethylene glycol, diisobutyl adipate, oleic amide, erucic amide, palmitic amide, dimethyl acetamide, dimethyl sulfoxide, methyl pyrrolidone, tetramethylene sulfone, oxa monoacids, oxa diacids, polyoxa diacids, diglycolic acids, triethyl citrate, acetyl triethyl citrate, tri-n-butyl citrate, acetyl tri-n-butyl citrate, acetyl tri-n-hexyl citrate, alkyl lactates, phthalate polyesters, adipate polyesters, glutate polyesters, diisononyl phthalate, diisodecyl phthalate, dihexyl phthalate, alkyl alylether diester adipate, dibutoxyethoxyethyl adipate, and mixtures thereof.

18. The flushable tampon applicator of claim 11 wherein the processing aid is a nucleating agent selected from the group of polyhydroxybutyrate, sorbitol acetal, boron nitride, titanium oxide, talc, clay, calcium carbonate, sodium chloride, metal phosphate, and mixtures thereof.

19. The flushable tarpon applicator of claim 11 wherein the processing aid is a filler selected from the group of clays, silica, mica, wollastonite, calcium hydroxide, calcium carbonate, odium carbonate, magnesium carbonate, barium sulfate, magnesium sulfate, kaolin, calcium oxide, magnesium oxide, aluminum hydroxide, talc, titanium dioxide, wood flour, walnut shell flour, alpha cellulose floc, cellulose fibers, chitin, chitosan powders, organosilicone powders, nylon powders, polyester powders, polypropylene powders, starches and mixtures thereof.

20. The flushable tampon applicator of claim 11 wherein the processing aid is a lubricant selected from the group consisting of metal soaps, hydrocarbon waxes, fatty acids, long-chain alcohols, fatty acid esters, fatty acid amides, silicones, fluorochemicals, acrylics, and mixtures thereof.

21. A flushable tampon applicator comprising:
a polyhydroxyalkanoate copolymer comprising at least two randomly repeating monomer units
wherein a first monomer unit has structure (I)

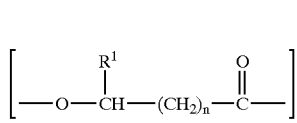

(I)

where $R^1$ is $CH_3$, and n is 1; and
wherein a second monomer unit has structure (II)

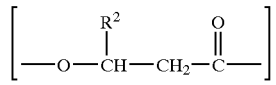

(II)

where $R^2$ is $CH_2CH_2CH3$;
wherein between 2 and 8% of the randomly repeating monomer units has the structure of the second monomer unit, and
wherein the applicator is greater than 50% disintegrated within 28 days under anaerobic disintegration conditions.

22. The flushable tampon applicator of claim 21 wherein the applicator is greater than 60% disintegrated within 28 days under anaerobic disintegration conditions.

23. The flushable tampon applicator of claim 21 wherein the applicator is greater than 80% disintegrated within 28 days under anaerobic disintegration conditions.

24. A process of forming a molded or extruded article, comprising:
heating to a molten state a polyhydroxyalkanoate copolymer comprising at least two randomly repeating monomer units
wherein a first monomer unit has structure (I)

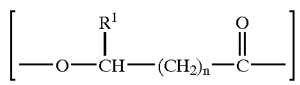

(I)

where $R^1$ is $CH_3$, and n is 1; and
wherein a second monomer unit has structure (II)

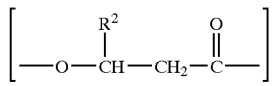

(II)

where $R^2$ is $CH_2CH_2CH_3$;
wherein between 2 and 8% of the randomly repeating monomer units have the structure of the second monomer unit, allowing the melted blend to anneal; and molding or extruding the article, the process having an annealing cycle time that is at least 10 seconds less than an annealing cycle time to form a molded or extruded article having the at least two randomly repeating monomer units wherein 8% or greater than 8% of the randomly repeating monomer units have the structure of the second monomer unit.

* * * * *

UNITED STATES PATENT AND TRADEMARK OFFICE
CERTIFICATE OF CORRECTION

PATENT NO. : 6,706,942 B1
DATED : March 16, 2004
INVENTOR(S) : Jean Jianqun Shao et al.

It is certified that error appears in the above-identified patent and that said Letters Patent is hereby corrected as shown below:

Column 4,
Line 30, before "zone", insert -- rear --.

Column 5,
Line 17, delete "300%" and insert -- 30% --.

Column 10,
Line 49, after "interest", insert a period, -- . --.

Column 16,
Line 5, after "5.8 mol %", delete "is".
Line 30, delete "Q4C6" and insert -- C4C6 --.
Line 41, after "test", insert a period, -- . --.

Column 20,
Line 51, delete "tarpon" and insert -- tampon --.
Line 54, delete "odium" and insert -- sodium --.

Signed and Sealed this

Thirtieth Day of November, 2004

JON W. DUDAS
*Director of the United States Patent and Trademark Office*